Feb. 14, 1967    R. E. LEVINSON    3,303,581
SCALE MODEL DOOR FRAMES
Filed April 6, 1965    6 Sheets-Sheet 1
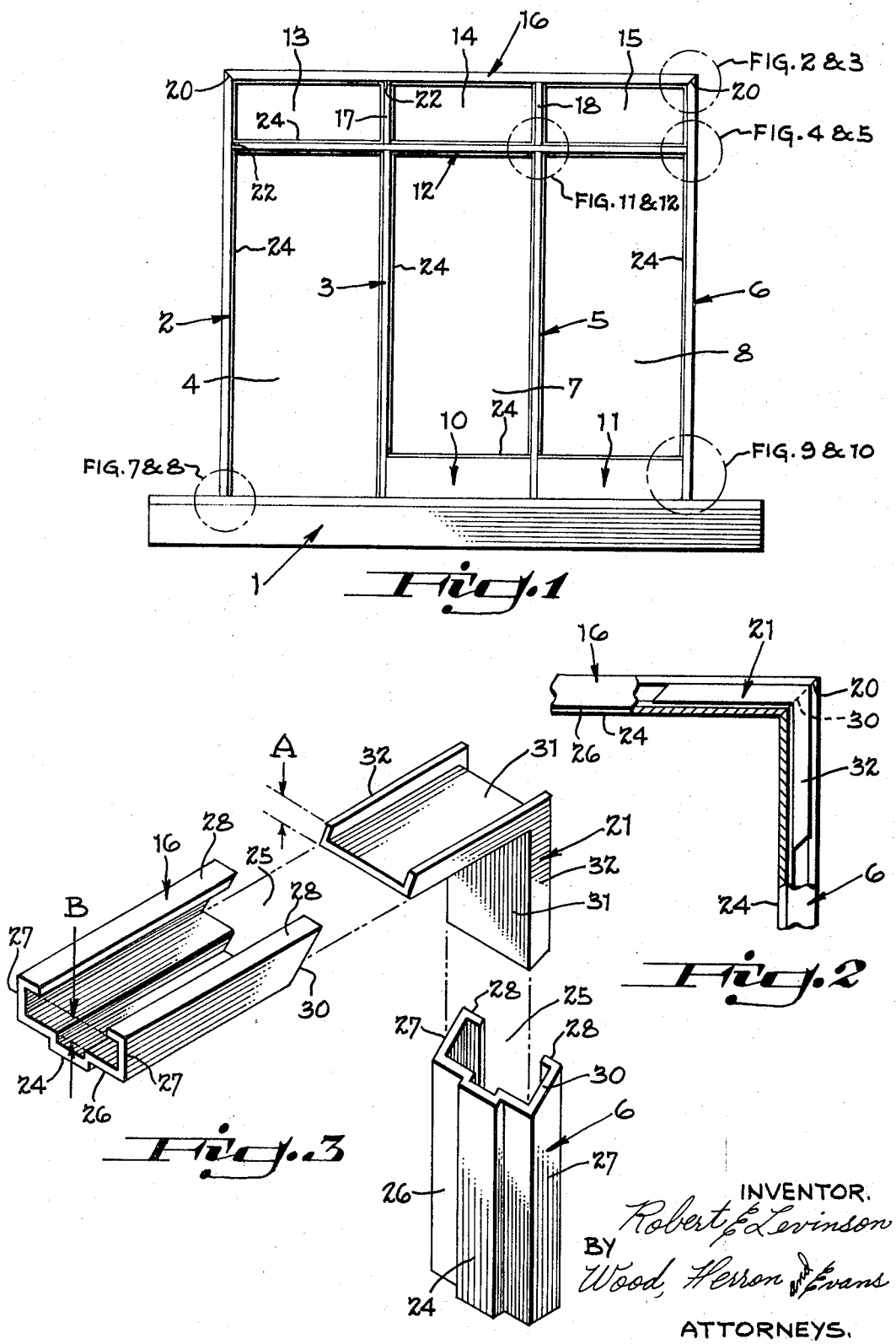

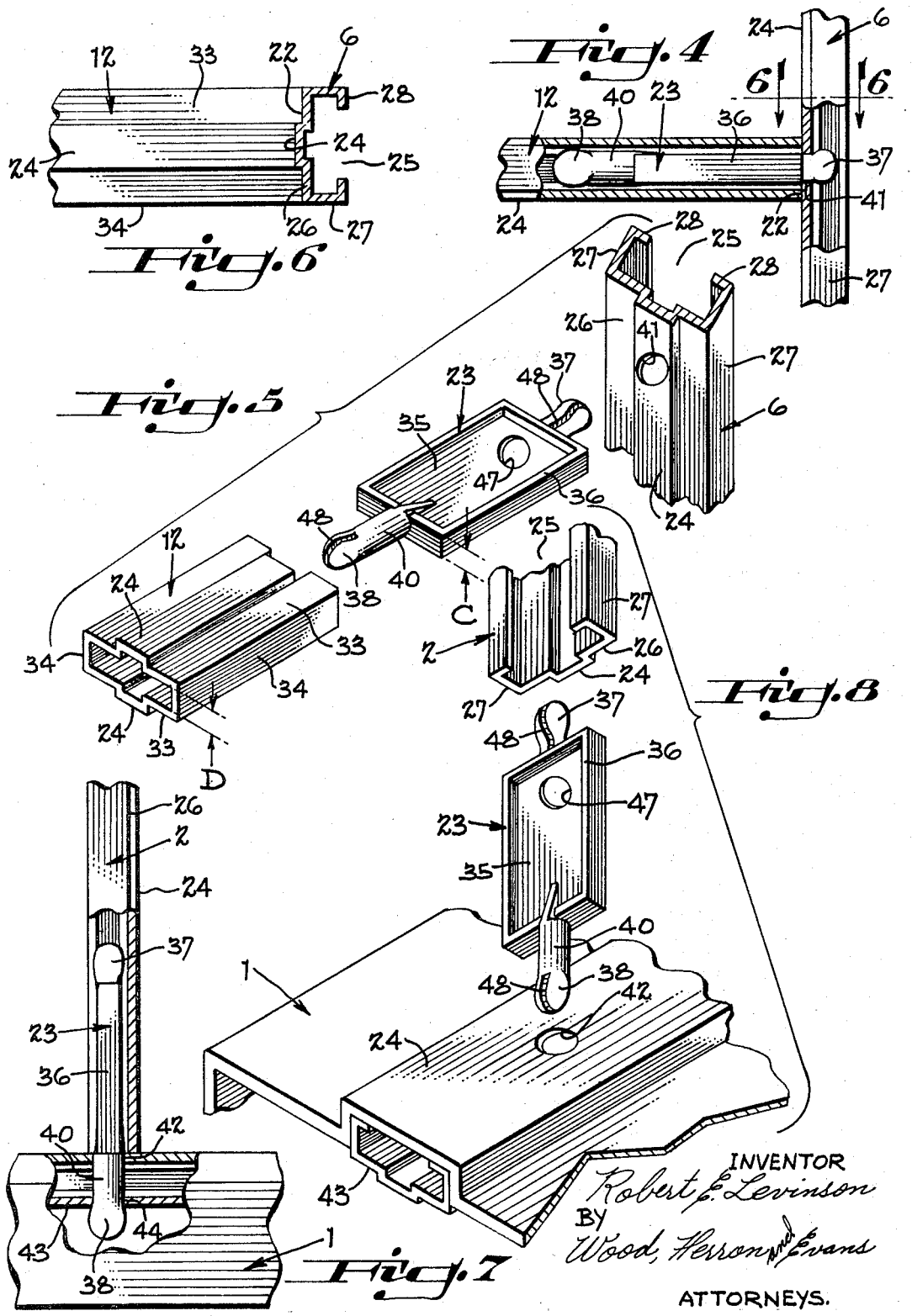

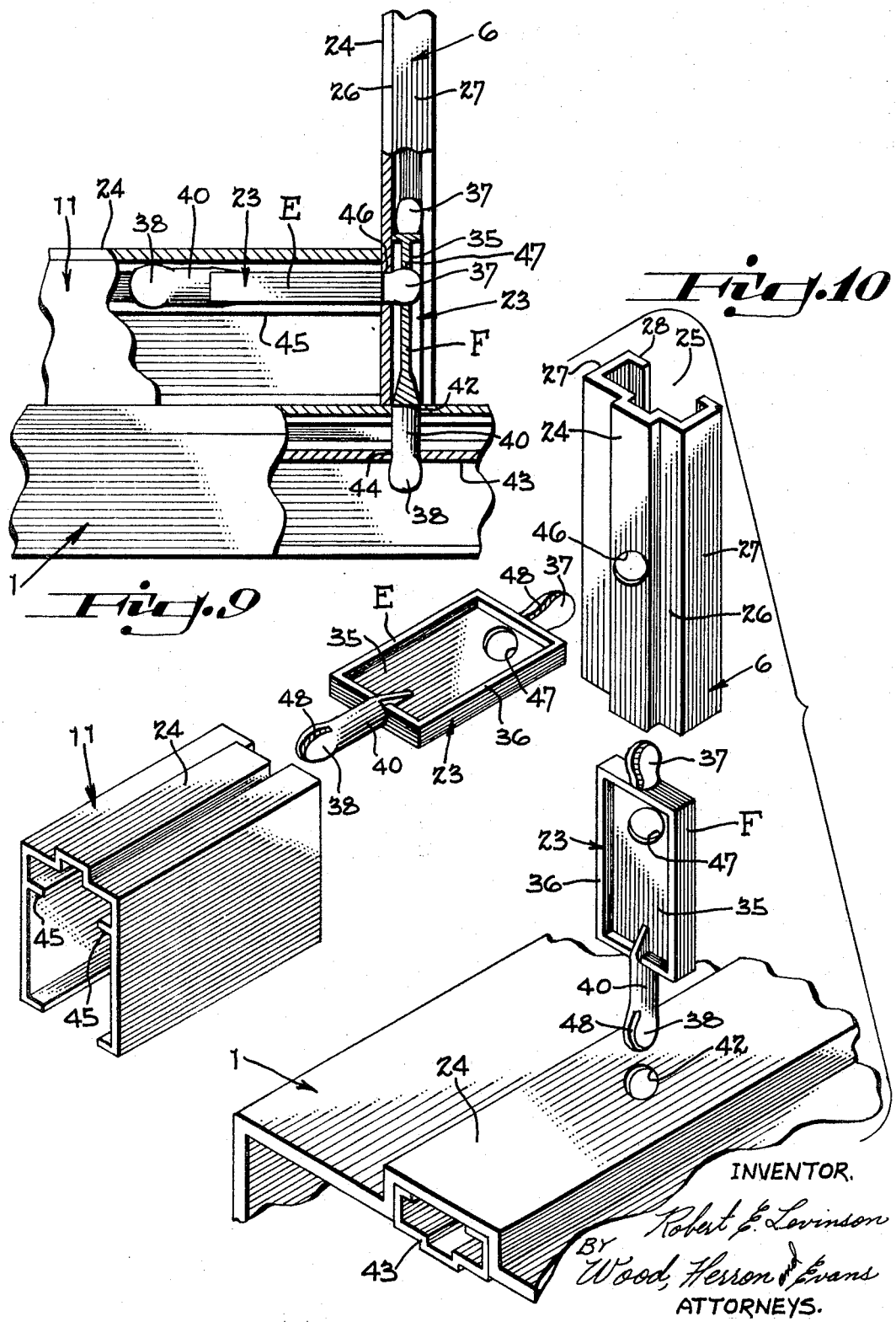

Feb. 14, 1967  R. E. LEVINSON  3,303,581

SCALE MODEL DOOR FRAMES

Filed April 6, 1965  6 Sheets-Sheet 4

INVENTOR.
Robert E. Levinson
BY Wood, Herron & Evans
ATTORNEYS

INVENTOR
Robert E. Levinson
BY
Wood, Herron & Evans
ATTORNEYS.

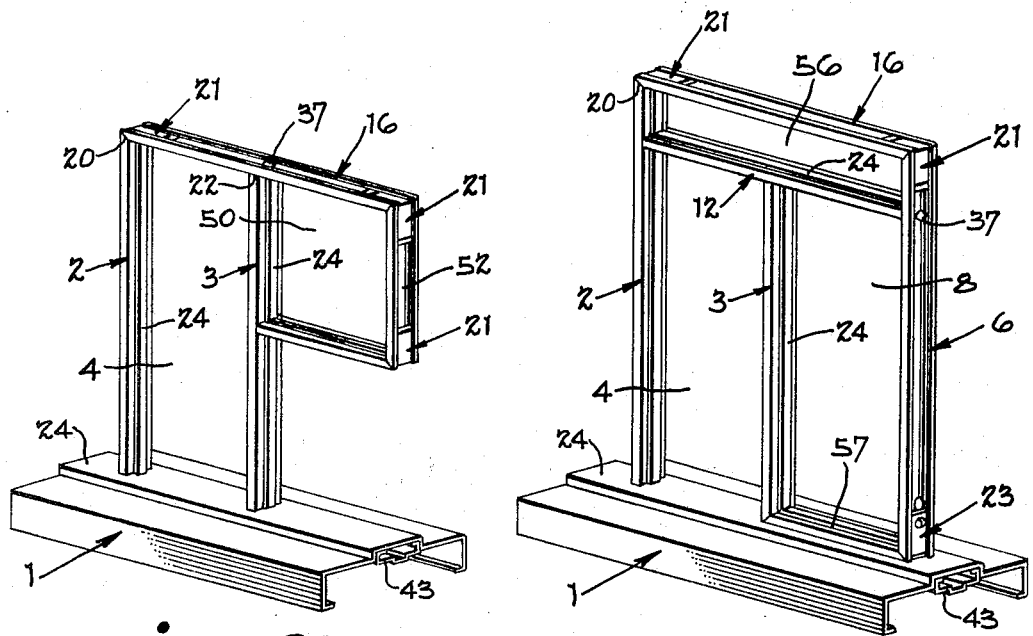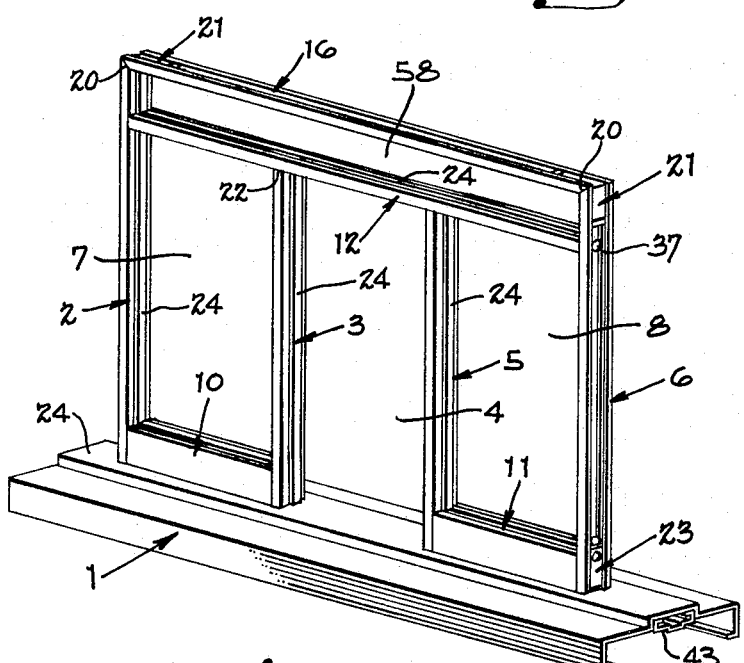

United States Patent Office 3,303,581
Patented Feb. 14, 1967

3,303,581
SCALE MODEL DOOR FRAMES
Robert E. Levinson, Cincinnati, Ohio, assignor to The Steelcraft Manufacturing Company, Rossmoyne, Ohio, a corporation of Ohio
Filed Apr. 6, 1965, Ser. No. 446,796
13 Claims. (Cl. 35—16)

This invention relates to a miniature, scale model door frame of sectional form, utilizing interchangeable framing sections by means of which several types of frame structures may be assembled. The sectional frame is intended primarily for use by the architect or salesman in order to present or demonstrate various proposed door frame designs in miniature scale model form.

One of the primary objectives of the invention has been to provide a miniature door frame having interchangeable framing sections or members which are furnished in kit form and which may be assembled in a convenient manner to form various types of door frames, together with side lights of various design and including, in some instances, openings for the transom frame above the door or side light frame.

According to this aspect of the invention, the interchangeable framing sections represent miniature counterparts of a standardized full size door frame structure which is formed of sheet metal and assembled by welding. The miniature framing sections preferably are formed of a plastic material which is slightly flexible, with the ends of the pieces mitered or squared to form respective miter joints or butt joints upon assembly of the miniature door frame.

A further objective has been to provide a plurality of corner connector clips for joining the mitered joints at the ends of the framing sections in assembly, permitting the user to erect the diminutive, scale model frame in a rapid convenient manner.

The corner connector clips are in the form of right angular pieces which telescopically interfit the mitered end portions of the hollow framing pieces adjacent the miter joint. The corner connector clips provide a frictional engagement with the framing sections and form a joint which represents the welded connection in the actual full size sheet metal frame structure.

A further objective has been to provide a butt type connector for joining the framing sections together where the end of a given framing section is butted up against a companion section, as distinguished from the miter joint outlined above.

In general, the butt type connector comprises a splice clip having a generally rectangular body including, at opposite ends, a spherical coupling head which is split longitudinally to adapt the coupling head to be compressed slightly. The body of the butt joint is telescopically slipped into the end portion of one of the hollow framing sections, for example, one of the transverse sills or transom bars, with the coupling head projecting outwardly from the end of the framing section. The framing section to which the transverse section is to be attached, such as a vertical door jamb, includes apertures at selected locations adapted to provide a snap-fit when the coupling head is forced into the aperture, thus providing a secure attachment between the ends of the transverse pieces and the vertical pieces.

The splice clip is also utilized in connecting certain of the vertical framing sections to the horizontal section and at intersections of the sections. In addition, the splice clips coact with one another in making double connections at right angles to one another at certain points, as outlined below in the specification.

The various aspects of the drawings will be more clearly apparent to those skilled in the art from the following detailed description made in conjunction with the attached drawings.

In the drawings:

FIGURE 1 is an elevation illustrating a typical miniature scale model door frame assembly of the present invention.

FIGURE 2 is an enlarged fragmentary view taken from FIGURE 1, as indicated by the circle in broken lines on FIGURE 1, illustrating one of the corner clips which interconnect the mitered corners of the jamb sections and head section.

FIGURE 3 is an exploded perspective view, as indicated in the circle on FIGURE 1 further illustrating the corner clip arrangement and assembly procedure.

FIGURE 4 is an enlarged fragmentary view, partially in section, as indicated by the circle of FIGURE 1, illustrating the splice clip which is used in connecting the ends of the transom bar to the mullion and jamb sections.

FIGURE 5 is an exploded perspective view, also indicated by the circle on FIGURE 1, further illustrating the splice clip of FIGURE 4 and the way in which the parts are assembled.

FIGURE 6 is an enlarged sectional view taken along line 6—6 of FIGURE 4, further illustrating the butt joint of the transom bar with respect to the mullion and jamb sections.

FIGURE 7 is an enlarged fragmentary view, partially in section, taken from FIGURE 1 along the indicated circle, illustrating the splice clip arrangement which is utilized in connecting the lower ends of the mullions and jambs to the base section.

FIGURE 8 is an exploded perspective view, further illustrating the structure shown in FIGURE 7 and the procedure used in assembling the parts.

FIGURE 9 is an enlarged fragmentary view, partially in section, taken from FIGURE 1 as indicated by the circle, illustrating the splice clip arrangement which connects the mullions of the window opening to the sill section and to the base section.

FIGURE 10 is an exploded perspective view, further illustrating the structure of FIGURE 9 and the assembly procedure.

FIGURES 20, 21 and 22 illustrate several other typical scale model door and side light frame assemblies which may be assembled with the interchangeable sections and connecting elements of the invention.

General Arrangement

Figure 11:
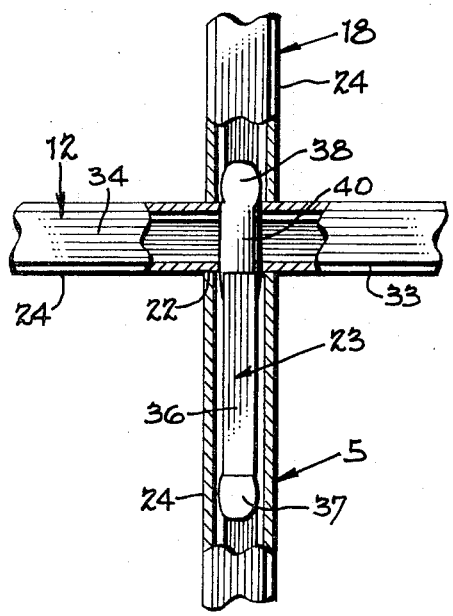
FIGURE 11 is an enlarged fragmentary view taken from FIGURE 1, as indicated by the circle, illustrating the connection provided by the splice clip between the mullions and transom bar of the window opening.

As noted earlier, the miniature sectional door frame of this invention utilizes a combination of hollow interchangeable framing sections which are joined to one another by corner clips and splice clips telescopically interfitting the end portions of the several framing sections. In the present example, the sections are of a slightly flexible plastic material and may be made by the extrusion process. The sections correspond in cross section to the actual sheet metal framing sections which they represent. In the preferred form of the invention, the framing sections are scale models of their full size counterparts, fabricated to a scale of one inch to the foot.

In order to provide for assemblying the several typical scale model frame structures, the framing sections and connectors are furnished to the user in kit form, with a sufficient number of interchangeable framing members, cut to the proper length, to make it possible for the user to select the required framing sections for a selected door frame, side lights and transoms. These parts are then joined together with the use of the corner connector clips for the mitered joints and the splice clips for the butt joints. These joints correspond with the welded joints which are used in fabricating the actual full size metal door, transom and side light frames.

FIGURE 1, which represents a door frame having a side lights and transoms, has been selected to illustrate a typical example of the invention. As shown in FIGURE 1, there is provided a base section 1, which is hollow in cross section, upon which is mounted the upright framing members. The base 1 forms no part of the miniature scale model except to provide a support base upon which to anchor the upright framing members. In order to stabilize the erected frame (FIGURE 1) in its upright position, the base 1 is substantially greater in width (FIGURE 8) than the framing members.

The upright framing members comprise the jamb sections 2 and 3, which delineate the door opening 4 and represent the sheet metal door frame. The vertical mullions 5 and 6, delineate the side light openings 7 and 8. It will be noted that the doorjamb section 3 also acts as one of the vertical mullions for the window opening 7.

The bottom portions of the side light openings 7 and 8 are delineated by window sill sections 10 and 11. The sill sections 10 and 11 are also generally hollow in cross section and fit between the lower portion of the jamb 3 and the vertical mullions 5 and 6.

The upper portion of the assembled door and side light frame includes a horizontal mullion 12 which delineates the lower edge of the transom openings 13, 14 and 15. The upper end of the sectional frame structure includes a head rail 16 having its outer ends joined to the upper ends of the jamb section 2 and vertical mullion 6. The transom openings include vertical mullion sections 17 and 18 extending between the horizontal mullion 12 and head rail 16 and are disposed in alignment with the jamb section 3 and vertical mullion section 5.

It will be noted that the abutting ends of the vertical jamb section 2 and vertical mullion section 6 provide mitered joints 20—20, with the opposite ends of the head rail 16. These joints are connected by means of the right angular corner clips indicated generally at 21 (FIGURE 2), described in detail later.

The points of intersection of the remaining framing sections are in the form of butt joints indicated at 22. The framing sections are joined together at the butt joints 22 by the splice clips, which are indicated generally at 23 (FIGURE 4), also described in detail later.

It will be understood at this point, that the jamb section 2, vertical mullion 6 and head rail 16 are all generally channel-shaped in cross section, corresponding in miniature to the actual size sheet metal framing sections, with the open side facing outwardly. The open sides of the sections in the actual structure are adapted to embrace the opening in the wall in which the frame is installed. The sill sections 10 and 11 and the base section 1 are also generally channel-shaped in this case with the open sides facing downwardly. The vertical mullions 5 and 6 and the horizontal mullion 12 are also hollow but do not include an open side.

The inner surface of the several framing members each include a central rib 24 as shown in FIGURE 8. In the case of the door opening 4, the ribs represent the conventional door stops, whereas the ribs 24 of the remaining sections represent glazing beads to receive the side light glass panes. It will be understood that in the miniature scale model, the door and glass lights are omitted, since the model structure is intended primarily to demonstate the actual sheet metal door frames which are available.

Corner clip construction

Described in detail (FIGURE 2 and 3) the vertical mullion 6, the jamb section 2 and the head rail 16 are all duplicates in cross section, but vary slightly in length. As noted above these sections are generally channel-shaped and each include an open side 25 facing outwardly. Thus, the corner connection shown in FIGURES 2 and 3 between the vertical mullion 6 and header 16 also represents the connection between the header 16 and the door jamb section 2.

Described in detail the sections 2, 6 and 16 each include a web 26, which includes the rib 24, with right angular side flanges 27—27 rising from the web. In addition, the side flanges 27 each include an inturned lip 28, which, as explained below confines the corner clip, previously indicated at 21. The ends of the framing sections 2, 6 and 16 are angulated as at 30 to provide the mitered joint 20, previously described.

The corner clip 21 (FIGURES 2 and 3) is of right angular configuration comprising the webs 31—31, each web having a pair of side flanges 32—32 rising outwardly along the opposite side edges of the webs 31. The height of the side flanges 32 is indicated at A and is substantially equal to the space between the web 26 and lips 28 of the framing members 2, 6 and 16, as indicated at B. The arrangement is such that the clip 21 provides a light press fit when it is telescopically interfitted within the end portions of the framing member, thereby to hold the framing members in assembled relationship. As noted above, the sections are made of slightly flexible plastic material which facilitates the frictional engagement between the corner clips and framing members. As noted earlier, miter joints 20 (FIGURES 1 and 2), which are connected by the corner clips 21 correspond with the welded miter joints of the full size sheet metal frame structure.

Splice clip construction

Figure 12:
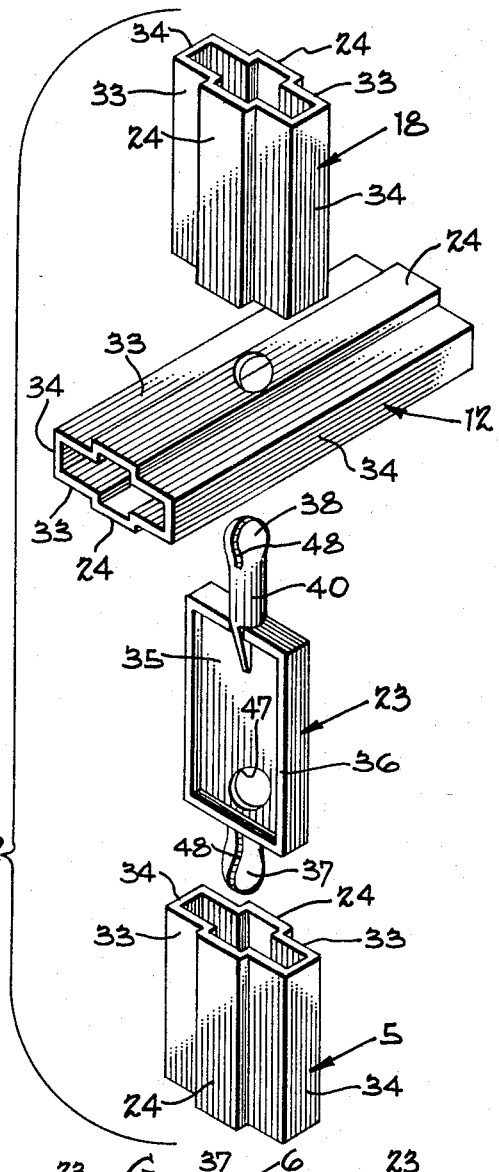
FIGURE 12 is an exploded perspective view further illustrating the structure of FIGURE 11.

As noted earlier (FIGURES 4 and 6), the connections between the remaining points of intersection of the framing members constitute butt joints 22, the connection being established by the splice clips 23. The splice clips are designed to interfit both the jamb section 2, the vertical mullions 3, 5 and 6, the horizontal mullion 12 and head rail 16. As explained in detail below, the base 1 and the framing members include openings which establish a snap-fit with respect to the splice clips 23. The splice clips, as explained below, are arranged to provide a single connection where one framing member is abutted against the second member (FIGURES 4 and 5) and are also arranged to provide a double connection where two framing members intersect (FIGURES 11 and 12).

The splice clip is also utilized in connecting the vertical mullion and jamb sections to the base 1, as shown in detail in FIGURES 7, 8, 9 and 10.

In other words, the splice clip 23 interfits the open channel-shaped framing section such as jamb section 2 and also the hollow closed mullion sections, such as vertical mullion 5.

FIGURES 4 and 5 illustrate the butt joint 22 between the vertical mullion 6 and the horizontal transom bar or mullion 12. Thus, the horizontal mullion 12 comprises upper and lower webs 33, which include the ribs 24, previously noted, and also side walls 34—34, thus forming an enclosed hollow member.

Each splice clip 23 comprises a rectangular body 35 having a marginal flange 36. One end of the body 35 includes a compressible coupling head 37. The opposite end of the body 35 includes a second coupling head 38 which is similar to the head 37 but includes an elongated shank 40 which spaces head 38 outwardly from the end of the body 35. The purpose of this arrangement is explained below.

In the example illustrated (FIGURES 4 and 5), the upper portion of the vertical mullion 6 is provided with an aperture 41 adapted to receive the compressible coupling head 37, whereby the head provides a snap-fit with respect to the vertical mullion 6. This arrangement is described in detail below with reference to FIGURES 13–15.

In assembling the frame (FIGURES 4 and 5), the body 35 of the splice clip 23 is inserted into the end portion of the horizontal mullion 12. By virtue of the snap-fit of head 37 with respect to aperture 41, the mullion is firmly connected to the vertical mullion 12. The opposite end of horizontal mullion 12 is similarly connected to the jamb section 2. In order to provide a light friction fit between the body 35 of the splice clip 23 and the interior surface of horizontal mullion 12, the thickness of body 35 and the inside dimension of the mullion 12 are substantially equal as indicated at C and D (FIGURE 5).

The connection between the base 1 and jamb section 2 is shown in FIGURES 7 and 8. In this case, the body 35 is telescopically inserted within the lower end portion of the jamb section 2, with the compressible coupling head 37 disposed to the interior of the jamb section. The interior dimension B of section 2 is equal to the interior dimension D of the closed mullion section 12, as described above, so as to provide a friction fit with respect to the body 35 of the splice clip 23. In this instance, the compressible head 38 of the splice clip is inserted into an aperture 42 formed in the base 1. As shown in FIGURES 7 and 8, the base is provided with a channel-shaped insert 43 interfitting the rib 24 of base 1 and adhesively secured in place. The insert 43 includes a similar aperture 44 (FIGURE 7), the arrangement being such that the shank 40 passes through the apertures 42 and 44, with the head 38 establishing a snap-fit with respect to insert 43.

FIGURES 9 and 10 disclose the double connection of the vertical mullions 3, 5 and 6 to the base section 1 and also with respect to the sill sections 11. In this arrangement, the body 35 of one splice clip 23 is inserted into the vertical mullion 6, with the head 38 projecting through the apertures 42 and 44 of the rib 24 and insert 43, as described above with reference to FIGURES 7 and 8. A second splice clip 23 is inserted into the end portion of the sill section 11.

As best shown in FIGURE 10, the sill section 11 includes internal flanges 45 to provide an opening suitable for receiving the body 35 of the splice clip 23.

In this instance, the head 38, which includes the shank 40, is inserted within the sill 11, while the compressible head 37 projects outwardly in assembled relationship. The horizontal splice clip E of sill 11 is disposed at right angles to the vertical splice clip F of the vertical mullion 6. The vertical mullion 6 includes an aperture 46 (FIGURE 10) and each splice clip includes an aperture 47. The arrangement is such that the head 37 of horizontal splice clip E passes through the opening 46 of vertical section 6 and establishes a snap-fit with respect to the apertures 47 of vertical splice clip F, as shown in FIGURE 9.

FIGURES 11 and 12 illustrate the connection which is established at the intersection of the horizontal mullion 12 and the vertical mullion sections 5 and 18, as previously indicated by the broken circle in FIGURE 1. As shown in FIGURES 11 and 12, a body of the spliced clip 23 is inserted into the vertical mullion 5 with the shank 40 projecting through the horizontal mullion 12, thus locking the vertical mullion 5 to the horizontal mullion 12.

In addition, the head 38 projects above the mullion 12 and establishes a frictional engagement with the lower end portion of the short vertical mullion 18. The upper end of the short vertical mullion 18 (not shown) is connected to the head rail 16 by a splice clip 23 similar to the arrangement shown in FIGURES 4 and 5.

A connection similar to that shown in FIGURES 11 and 12 is established between the vertical jamb section 3 and short vertical mullion section 17 at the points of intersection with the horizontal mullion 12.

Coupling heads

Figures 13, 14, 15:
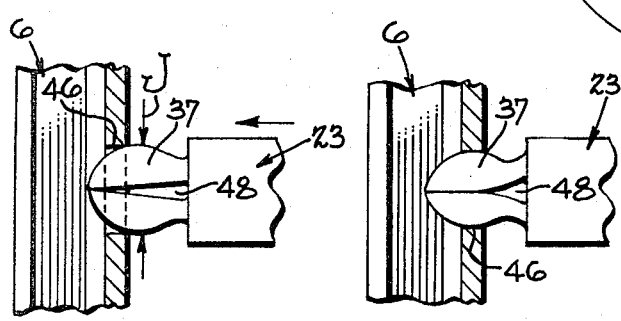
FIGURES 13, 14 and 15 are enlarged fragmentary views illustrating the action of the compressible coupling heads in establishing a snap connection with respect to the framing sections.

By use of the compressible head in establishing its snap-fit with the framing members is shown in FIGURES 13, 14 and 15. It will be noted that the expanded diameter G of the coupling heads 37 and 38 is substantially greater than the diameter H of the apertures of the framing members, for example, aperture 46 of member 6. The transverse dimension of the coupling head, that is, at right angles to the diameter G is approximately equal to the compressed diameter of the head to permit passage through the aperture 46. In order to provide the snap-fit, the coupling heads 37 and 38 are slotted longitudinally as at 48. Thus, when the coupling head is forced endwisely into its aperture 46 (FIGURE 13) the slot 48 permits the coupling head to be compressed through a camming action, as indicated by the arrows J. After passing through the opening, the head again expands to its normal size (FIGURE 15), thus locking the splice clip 23 in place. Upon withdrawal, the coupling head is again compressed by a camming action with respect to the aperture.

Other typical frame assemblies

Figure 16:
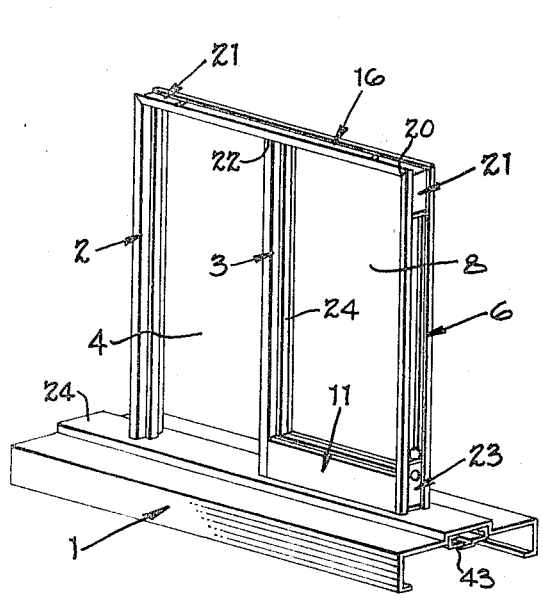
FIGURES 16, 17 and 18 are perspective views illustrating several assemblies of typical scale model frames with side lights which may be assembled from the interchangeable framing sections of the invention.

The assembled scale model frame shown in FIGURE 16 represents a combination assembly having a header 16, and door jambs 2 and 3, delineating a door opening 4. The structure includes a side light opening 8 constituted by the jamb section 3 and a vertical mullion 6. In this case the side light opening includes a sill 11. The framing members are assembled by the use of the corner clips 21 and splice clips 23 in the manner previously described.

Figure 17:
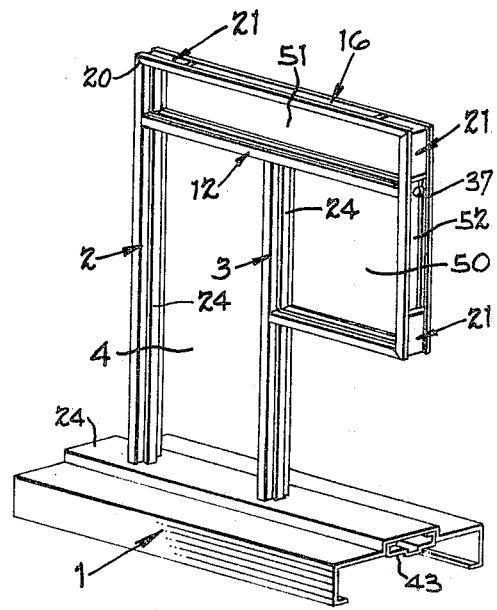

The frame assembly shown in FIGURE 17 represents a structure comprising a door frame 4 and a half light 50 mounted on the base section 1. In this case, there is provided a transom opening 51 constituted by the head rail 16 and a horizontal mullion 12. In this example, the outer side of the frame or half light 50 is constituted by a half length mullion 52. These sections are also assembled as described earlier by the use of corner clips 21 and splice clips 23.

Figure 18:
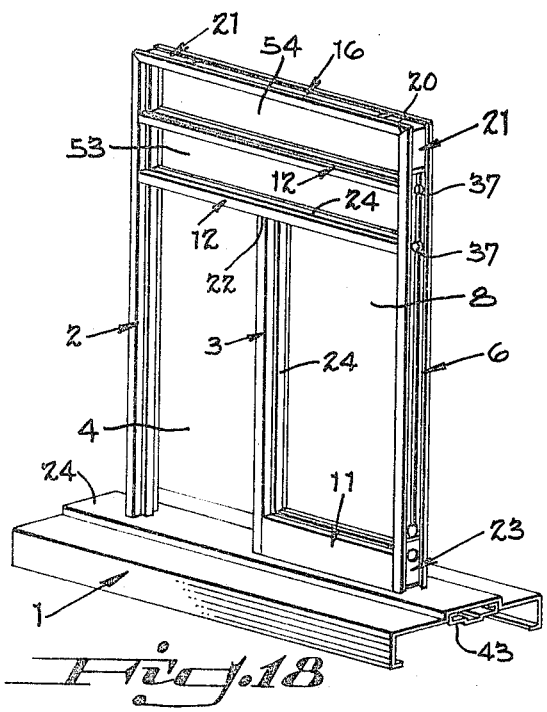

In the example shown in FIGURE 18 the frame comprises a door opening 4 and a full length side light 8. This structure differs from that shown in FIGURE 16 in that it is provided with two transom openings 53 and 54 delineated by two horizontal mullions 12—12.

Figure 19:
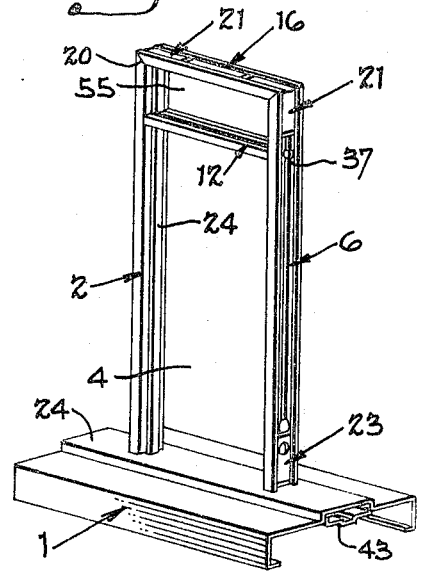
FIGURE 19 is a perspective view showing a door frame including a transom bar without side lights.

In FIGURE 19 the sections are assembled to form a door opening 4, utilizing jamb sections 2 and 6 assembled by means of corner clips 21. This structure includes a head rail 16 and a horizontal mullion 12 delineating the transom openings 55. Mullion 12 is secured in place by means of splice clips 23.

FIGURE 20 illustrates an assembled frame similar to that shown in FIGURE 17. However, in this instance, the transom opening 51 is omitted.

The frame assembly of FIGURE 21 is generally similar to that of FIGURE 16, having a side light opening 8. This structure differs from that shown in FIGURE 16 in providing a transom opening 56. In this structure the sill 11 of FIGURE 16 is omitted and instead, the lower member of the side light frame comprises a mullion section 57.

The example illustrated in FIGURE 22 is generally similar to that shown in FIGURE 1. However, in this example, the door opening 4 is located at the center of the framing assembly, with side light openings 7 and 8 flanking the door opening 4 on opposite sides. In this example, the transom opening 58 extends continuously across the frame assembly, the short vertical mullion sections 17 and 18 of FIGURE 1 having been omitted.

Having described my invention I claim:

1. A miniature sectional door frame for demonstrating a plurality of door frame assemblies utilizing interchangeable framing sections, said door frame comprising:
   a base adapted to support the assembled miniature frame assembly;
   a pair of jambs in the form of generally hollow sections adapted to be mounted vertically upon said base;
   respective splice clips interfitting the lower end portions of said jamb sections;
   said splice clips including coupling heads projecting downwardly below the lower ends of said jambs, with the said lower ends of the jamb sections resting upon the base;
   said base including apertures adapted to receive said coupling heads, thereby to connect the lower ends of the jamb sections in abutting engagement with said base;
   a head rail in the form of a generally hollow section extending across the upper ends of the vertical jamb sections;
   and connector elements interconnecting the opposite end portions of the head rail section to the upper end portions of the vertical jamb sections.

2. A miniature sectional door frame for demonstrating a plurality of door frame assemblies utilizing interchangeable framing sections, said door frame comprising:
   a base in the form of a generally hollow section adapted to support the miniature frame assembly;
   a pair of vertical jambs in the form of generally hollow sections adapted to be mounted vertically upon said base section;
   respective splice clips interfitting the lower end portions of said jamb sections;
   said splice clips including compressible coupling heads projecting downwardly below the lower ends of said jamb sections, with the said lower ends of the jamb sections resting upon the base section;
   said base section including apertures adapted to receive said compressible coupling heads and to provide a snap-fit with said coupling heads, thereby to detachably connect the lower ends of the vertical jamb sections in abutting engagement with said base section;
   a horizontal head rail in the form of a generally hollow section extending across the upper ends of the vertical jambs sections;
   and corner clips inserted into the adjoining end portions of the jamb sections and head rail section and connecting the end portion of the horizontal head rail section to the upper end portion of the vertical jamb sections.

3. A miniature sectional door frame as set forth in claim 2 in which each of said splice clips comprises a body telescopically interfitting the lower end portion of the jamb section and in which a coupling head projects from one end of said body, said coupling head being generally spherical and being slotted longitudinally, the aperture of said base section being circular and having a diameter smaller than the spherical coupling head, said slotted coupling head being compressible and providing a camming action upon being forcibly inserted into said aperture to provide a snap-fit with respect to the base section.

4. A miniature sectional door frame as set forth in claim 2 in which the base includes parallel spaced horizontal walls having apertures formed therethrough in alignment with one another and in which each splice clip comprises a body telescopically interfitting the lower end portion of the jamb section, said body including a shank portion extending outwardly beyond the end of said body and beyond the end of said jamb section, said coupling head being disposed at the outer end of said shank, the length of said shank adapting the coupling head to be inserted through both of the apertures of the horizontal walls of said base section with the coupling head projecting below the lower of said horizontal walls, thereby stabilizing the said vertical jamb section.

5. In a miniature sectional door frame, a splice clip as set forth in claim 4 in which the coupling head of the splice clip is formed of generally flexible material and includes a longitudinal slot, said slot adapting the coupling head to be compressed upon being forced through the apertures of the spaced horizontal walls of said base, thereby adapting the coupling head to provide a snap-fit with respect to the said spaced horizontal walls and to stabilize the vertical jamb sections.

6. A miniature sectional door frame as set forth in claim 2 in which the head rail sections and the vertical jamb sections are formed of material which is at least slightly resilient, adapting the splice clips and corner clips to be frictionally engaged upon being inserted into the end portions of said sections.

7. A miniature sectional door frame as set forth in claim 6 in which the adjoining ends of the horizontal head rail section and the ends of the vertical jamb sections are angulated to provide a mitered joint and in which the said corner clip comprises a pair of limbs disposed at right angles to one another, said limbs being generally channel-shaped in cross section and providing a frictional engagement with the end portions of the hollow jamb sections and head rail sections, thereby to connect the opposite end portions of the horizontal head rail section to the end portions of the vertical jamb sections to form a miter joint.

8. A miniature sectional door frame in the form of a scale model for demonstrating a plurality of door frame assemblies including at least one transom opening and utilizing interchangeable parts, said door frame comprising:
   a horizontal base adapted to support the assembled door frame;
   a pair of vertical jamb sections of generally hollow configuration in cross section adapted to be mounted vertically upon said base;
   respective splice clips telescopically interfitting the lower end portions of said jamb sections;
   said splice clips each including a coupling head projecting downwardly below the lower end of said jamb section, with the lower ends of the jamb sections resting upon the base;
   said base including apertures extending therethrough and adapted to provide a snap-fit with respect to said coupling heads, thereby to detachably connect the lower ends of the vertical jamb sections in abutting engagement with said horizontal base section;
   a horizontal head rail which is generally hollow in cross section extending across the upper ends of the vertical jamb sections;
   corner clips connecting the opposite ends of the horizontal head rail to the upper ends of the vertical jamb sections;

a horizontal mullion rail disposed in a plane below the head rail and extending transversely between said vertical jamb sections;

said head rail and mullion rail delineating said transom opening;

the ends of said horizontal mullion rail being in abutting relationship with said vertical jamb sections;

and splice clips interfitting the abutting end portions of said horizontal mullion rail;

said splice clips including a compressible coupling head projecting outwardly beyond the ends of said horizontal mullion rail;

said jamb sections including apertures adapted to receive said coupling heads, thereby to provide a snap-fit therewith and detachably connecting the ends of the horizontal mullion rail to the vertical jamb sections.

9. A miniature sectional door frame assembly in the form of a scale model for demonstrating a plurality of door frame assemblies including at least one side light frame flanking the dor frame assembly, said sectional door frame utilizing interchangeable sections for said door frame and said light frame, said door frame comprising:

a base section adapted to support the miniature frame assembly;

an outer and an intermediate vertical jamb section, generally of hollow configuration rising from said base section;

at least one vertical mullion section rising from said base section in spaced relationship to said intermediate vertical jamb section;

said vertical mullion section and intermediate vertical jamb sections delineating said side light frame;

a horizontal head rail section extending transversely across the upper ends of the jamb sections and vertical mullion section;

respective corner clips interfitting said horizontal head rail section and detachably connecting said outer vertical jamb section and vertical mullion section to the horizontal head rail section;

and splice clip interfitting the upper end portion of said intermediate vertical jamb section and interconnecting said upper end to the horizontal head rail section;

said splice clip including a compressible coupling head projecting upwardly beyond the upper end of the intermediate jamb section;

said horizontal head rail including an aperture, said coupling head providing a snap-fit with respect to said aperture and detachably connecting the intermediate vertical jamb to the head rail.

10. A miniature sectional door frame assembly in the form of a scale model for demonstrating a plurality of door frame assemblies including at least one side light frame flanking the door frame assembly and a transom frame extending across said door frame and side light frame, said sectional frame utilizing interchangeable sections, said door frame comprising:

a base section adapted to support the miniature frame assembly;

an outer and an intermediate vertical jamb section, generally of hollow configuration rising from said base section;

at least one vertical mullion section rising from said base section in spaced relationship to said intermediate vertical jamb section;

said vertical mullion section and intermediate vertical jamb sections delineating said side light frame;

a horizontal head rail section extending transversely across the upper ends of the jamb sections and vertical mullion section;

respective corner clips interfitting said horizontal head rail section and detachably connecting said outer vertical jamb section and vertical mullion section to the horizontal head rail section;

a horizontal mullion section disposed in a plane disposed below said horizontal head rail section and having opposite ends abutting said outer vertical jamb section and outer vertical mullion section;

a splice clip interfitting the upper end portion of said intermediate vertical jamb section and interconnecting said upper end to the horizontal mullion section;

a pair of splice clips interfitting the opposite ends of said horizontal mullion section which abuts the outer vertical jamb section and outer section mullion section;

said splice clips each including a compressible coupling head projecting upwardly beyond the upper end of the intermediate jamb section and beyond the opposite ends of the mullion section;

said horizontal mullion section including an aperture, said coupling head providing a snap-fit with respect to said aperture and detachably connecting the intermediate vertical jamb to the horizontal mullion section;

said outer vertical jamb section and said outer vertical mullion section including apertures, said coupling heads of the horizontal mullion section providing a snap-fit with respect to said coupling heads and detachably connecting the opposite ends of the horizontal mullion sections to said outer vertical jamb section and outer vertical mullion section.

11. A miniature sectional door frame, side light frame and transom frame as set forth in claim 10 in which there is provided a secondary, relatively short secondary vertical jamb section extending between said horizontal mullion section and horizontal head rail section, said secondary vertical jamb section being disposed in alignment with said intermediate vertical jamb section which delineates the side light frame, and a splice clip telescopically interfitted in the upper end of said intermediate vertical jamb section, said splice clip including a shank portion extending upwardly beyond the upper end of said intermediate jamb section and through said horizontal mullion section, said shank portion having a coupling head formed on the upper end thereof and projecting above the upper surface of said horizontal mullion section, said secondary vertical jamb section being of hollow cross sectional configuration and said coupling head being interfitted with the lower end portion of the secondary, relatively short vertical intermediate jamb section and holding the same in axial alignment with the said intermediate vertical jamb section.

12. A miniature sectional door frame and side light frame assembly as set forth in claim 10 in which there is provided a horizontal sill section which is generally hollow in cross section, said horizontal sill section being seated upon said base section and having opposite ends in abutment with said intermediate vertical jamb section and said vertical mullion section and delineating the lower portion of said side light frame, and respective splice clips interfitting the opposite end portions of said horizontal sill section, said splice clips each including a compressible coupling head projecting outwardly beyond the opposite ends of said sill section, said intermediate vertical jamb section and vertical mullion section including apertures, said coupling heads being inserted through said apertures and thereby detachably joining the sill section to said intermediate vertical jamb section and spaced vertical mullion section.

13. A miniature sectional door frame for demonstrating a plurality of door frame assemblies utilizing interchangeable framing sections, said door frame comprising:

a base adapted to support the assembled miniature frame assembly;

a pair of jamb sections of generally hollow cross section mounted vertically upon said base;

respective detachable connecting elements coupled to the lower portions of said jamb sections;

said base including coacting means adapted to receive said detachable connecting elements, thereby to connect the lower ends of the jamb sections in abutting engagement with said base;

a head rail section of generally hollow cross section extending across the upper end of the vertical jamb sections;

the adjoining ends of said vertical jamb sections and head rail section being angulated to provide a miter joint between the ends of the jamb sections and head rail section;

and detachable connector elements interconnecting the opposite end portions of the head rail section to the upper end portions of the vertical jamb sections.

References Cited by the Examiner

UNITED STATES PATENTS

| 1,292,508 | 1/1919 | Orr | 35—16 |
| 2,885,822 | 5/1959 | Onanian | 46—26 |
| 3,168,793 | 2/1965 | Gibson | 46—28 |
| 3,176,428 | 4/1965 | Slingluff | 46—17 |

FOREIGN PATENTS 827,583    2/1960    Great Britain.

EUGENE R. CAPOZIO, *Primary Examiner.*

H. S. SKOGQUIST, *Assistant Examiner.*